United States Patent [19]
Bowsky et al.

[11] Patent Number: 5,197,667
[45] Date of Patent: Mar. 30, 1993

[54] HVAC LOW POWER USAGE CIRCULATION BLOWER

[75] Inventors: Benjamin Bowsky, Ballwin; Jerry D. Lloyd, Florissant; Bernard Brown; Pradeep K. Sood, both of St. Louis, all of Mo.

[73] Assignee: Emerson Electric Co., St. Louis, Mo.

[21] Appl. No.: 643,180

[22] Filed: Jan. 18, 1991

[51] Int. Cl.$^5$ .............................. F24F 7/00
[52] U.S. Cl. .............. 236/49.3; 236/DIG. 9; 62/180; 62/186
[58] Field of Search .............. 62/186, 180; 236/49.3, 236/DIG. 9; 165/16; 310/68 R

[56] References Cited

U.S. PATENT DOCUMENTS

| | | | |
|---|---|---|---|
| 2,884,764 | 5/1959 | Siggelin | 62/186 X |
| 3,877,243 | 4/1975 | Kramer | 62/186 X |
| 4,257,238 | 3/1981 | Kountz et al. | 62/180 X |
| 4,259,847 | 4/1981 | Pearse, Jr. | 62/180 |
| 4,659,290 | 4/1987 | Kundert | 236/DIG. 9 |
| 4,815,524 | 3/1928 | Dempsey et al. | 165/12 |
| 5,006,744 | 4/1991 | Archer et al. | 310/68 R |

*Primary Examiner*—John Sollecito
*Attorney, Agent, or Firm*—Polster, Lieder, Woodruff & Lucchesi

[57] ABSTRACT

A field installable device for a conventional heating and air conditioning system (HVAC) is provided which operates a blower fan in conjunction with a standard thermostat. Presently, HVAC systems operate in four modes: heating, cooling, off and fan "on". The device includes a multi-pole, multi-speed motor and a control operatively connected between the thermostat and the motor. With the fan switch in the "on" position and heating or cooling called for, the control causes the blower to operate at a high speed, which may be different for heating or cooling. When the pre-selected temperature is reached the particular thermal operation (i.e., heating or cooling) is stopped. The control switches the motor to a speed substantially slower than the operating condition speed to provide continuing air circulation until the thermostat again calls for thermal operation. With the switch in "auto" position, the blower operates similarly to present systems.

20 Claims, 7 Drawing Sheets

HVAC LOW POWER USAGE CIRCULATION BLOWER

BACKGROUND OF THE INVENTION

This invention elates to heating, ventilating and air conditioning (herein HVAC) systems and in particular, to a field installable device for operating such systems more economical for air circulation. While the invention is described in detail with respect to HVAC applications, those skilled in the art will appreciate the wider applicability of the invention described below.

The user of conventional HVAC systems frequently chooses to let the system's blower operate continuously by setting the fan control switch on an associated thermostat to "on" position. This circulation mode of operation reduces temperature stratification, minimizes start drafts from duct work, improves humidity control, and increases the effectiveness of any associated air cleaners employed in conjunction with the HVAC system. By selecting the "on" position, the blower motor operates continuously, and the associated thermal feature, (i.e., either heating or cooling) operates on the "demand" setting of the thermostat.

Most present HVAC systems have provisions for operating the blower motor at one or more speeds The circulation or blower "on" mode of operation means the blower motor runs at the single speed for which the motor is configured for a particular thermal application. Generally the blower will operate at the highest set speed when the fan switch is "on". This speed usually is well in excess of what is necessary to achieve the benefits outlined above. This causes excess noise and energy usage. In addition, with the blower switch in the "on" position the unit no longer is able to select the system speed for cooling or heating. Even when systems are designed to select the proper speed in a multiple speed motor, for example, as disclosed in U.S. Pat. No. 4,815,524 ('524), the speed available for blower "on" use is higher than necessary for such operations, and can be responsible for cold spot corrosion, requiring the shut down period disclosed in the '524 patent.

More recently, HVAC systems have been designed to employ variable speed motors for blower control. While variable speed motors provide the desired results, their initial cost is high and they are not easily field installable without an additional electronic interface.

The invention disclosed hereinafter provides a motor and control, the control preferably being integrally constructed in the motor package. The motor and control are installable in conventional HVAC systems by field personnel. The control senses both the blower position setting and the thermal condition requirement called for by the thermostat The motor control combination allows a substantially lower speed during blower "on" operation, and the motor uses less energy than a conventional blower motor. That is to say, the motor of this invention allows lower, stable speeds at lower power consumption than motors of conventional designs for blower "on" operation. As a result, the pay back period for the modification to the HVAC system provided by the present invention is short, and easily recovered by the reduction in energy cost obtained in operational use.

SUMMARY OF THE INVENTION

One of the objects of this invention is to provide a device for a HVAC system which provides additional comfort and economical operation.

Another object of this invention is to provide a multiple speed blower motor apparatus for operating the blower motor at speeds substantially lower than possible with conventional blower motors.

Another object of this invention is to provide a device which operates in conjunction with a conventional thermostat, the system being capable of differentiating between the thermal modes of operation (i.e., "heating" and "cooling"), and blower or fan commands (i.e., "automatic" or "on") associated with such thermostat.

Another object of this invention is to provide a device which automatically switches between thermal operating speed and circulation speed upon pre-selected conditions determined by a conventional thermostat.

Another object of this invention is to provide a modification to HVAC systems which is readily incorporated in such systems.

Another object of this invention is to provide a low cost, economical conversion of HVAC systems to multiple pole operation.

Another object of this invention is to provide an extremely low speed for blower "on" operations as compared to blower speed during thermal (heating and cooling) condition operation.

Other objects of this invention will be apparent to those skilled in the art in light of the following description accompanying drawings.

In accordance with this invention, generally stated, a device for a HVAC system is provided which enables the HVAC system to run at a range of speeds. The HVAC system has a number of operating modes, and the speed of the blower depends upon which mode is selected at a particular time. One of the modes is a "thermal mode" which requires use of the blower, and a second mode is a "continuous or circulation mode" which requires use of the blower without thermal mode operation. A motor and control are provided for operating the motor such that the blower runs at a high speed when the thermal or heating/air conditioning mode is required, and at a substantially lower speed when the circulation mode is selected. The modification includes a multi-pole motor and a control operatively connected to the thermostat circuit for controlling motor operation. The modification includes a logic unit responsive to the switch mechanism of the thermostat for determining system operating mode. A motor speed controller is responsive to the logic means to control the speed of the blower. Because the control can distinguish among various thermostat settings, the motor can be designed to include an economical speed condition during continuous circulation operation of the blower, yet provide the higher speed required during thermal (heating and cooling) mode condition initiated by the thermostat. Other features will be in part apparent and in part pointed out hereinafter.

BRIEF DESCRIPTION OF THE DRAWINGS

In the drawings.

Corresponding reference characters indicate corresponding parts throughout the drawings.

DESCRIPTION OF PREFERRED EMBODIMENT

Figure 1B:
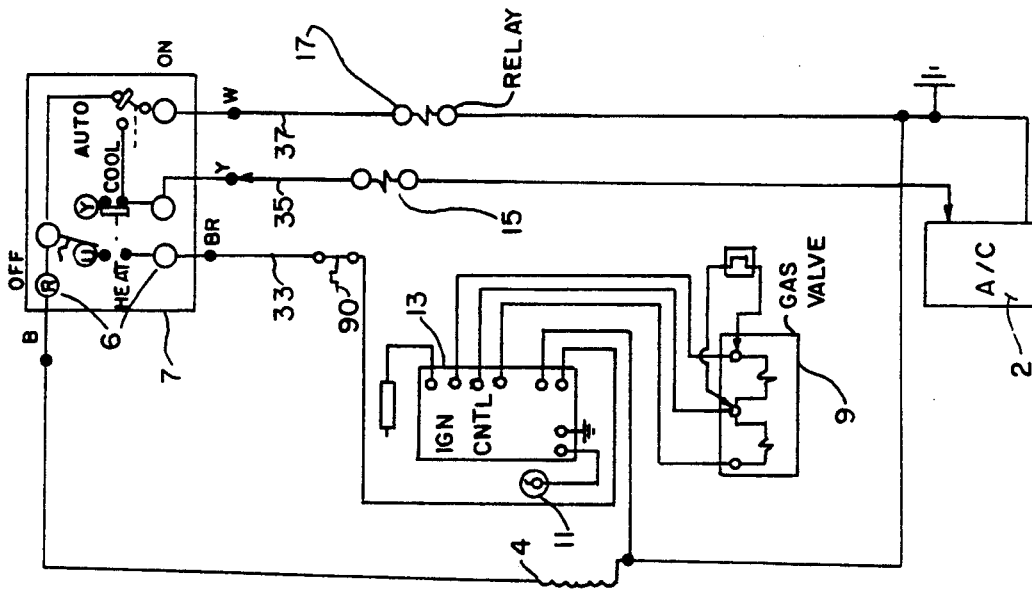
FIG. 1a is a physical location schematic and FIG. 1b is an electrical schematic of a prior art heating and air conditioning system.
Figure 1A:
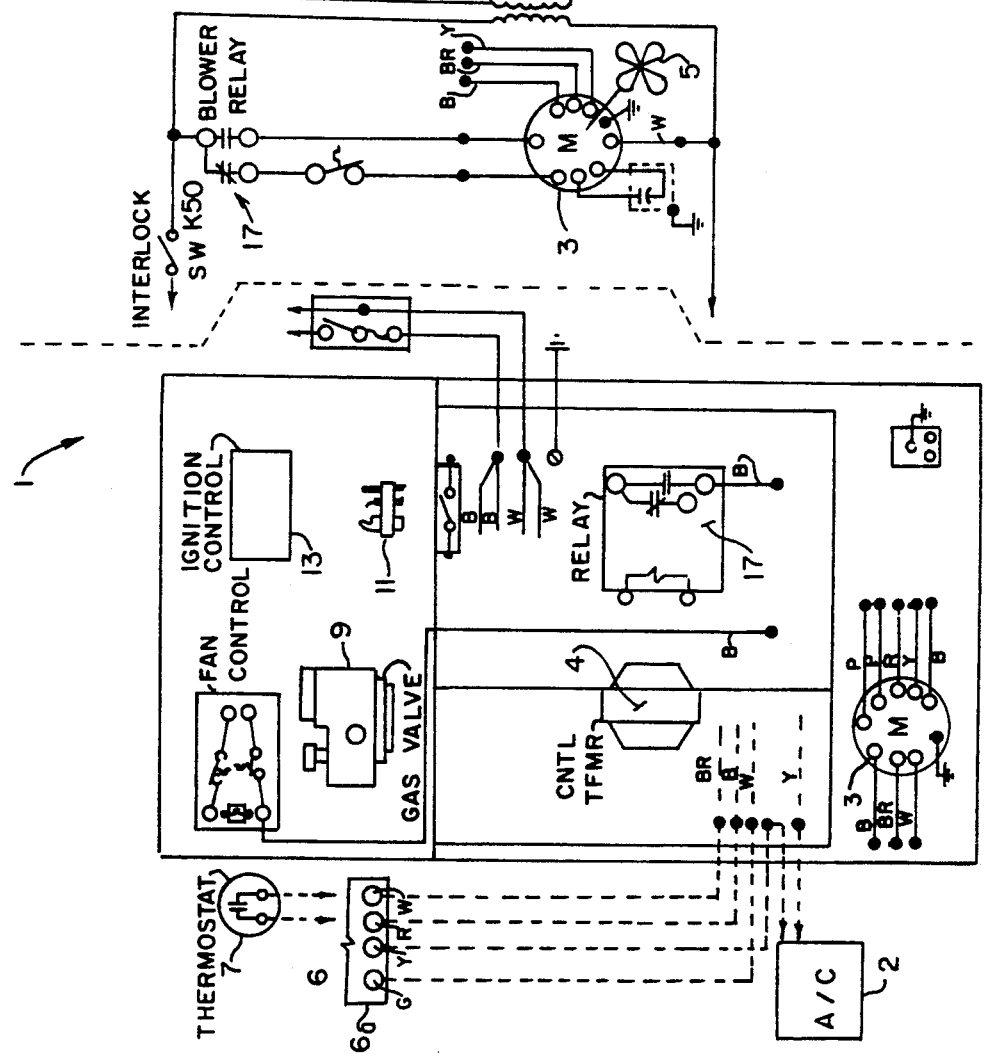

Referring now to the drawings, and in particular to FIGS. 1a and 1b, a conventional heating and air conditioning system (HVAC) is indicated generally by the reference numeral 1. FIG. 1a is a diagrammatic layout of the physical components of a conventional system, while FIG. 1b is a translation of the physical system into an electrical schematic. FIGS. 1a and 1b are typical of the type of schematic illustration provided with conventional HVAC systems installed in homes, for example, in which the present invention finds application.

As will be appreciated by those skilled in the art, the vast majority of HVAC systems employed in the home use a conventional thermostat control 7. The thermostat electrical system is a twenty four volt design, wired to the thermostat 7 by a four wire system. That is to say, the thermostat control 7 is interconnected to a terminal arrangement 6a having a four wires leading from it. The terminal arrangement 6a includes a plurality of terminals 6, conventionally denominated G, Y, R and W. In general, the thermostat 7 runs on a 24 volt system provided by a control transformer 4. As is shown in FIG. 1, the thermostat 7 includes a switch arrangement through which the thermal mode of operation, i.e., heating or air conditioning is selected. The thermostat 7 senses the temperature within the room or space to be heated or cooled, determines whether or not the sensed temperature compares with a selected temperature, and runs the HVAC system 1 as long as necessary to bring the temperature to the pre-selected level.

The heating portion of the HVAC system 1 includes a gas valve 9, a flame sensing electrode 11, and an ignition control means 13, all of which operate in a known way to heat the air which is then blown through duct work (not shown) by a blower 5, into the space to be heated.

The cooling portion of the HVAC system 1 includes an air conditioning unit 2, which also is a conventional arrangement. Again, the blower 5 is used to circulate cool air through the space for which a particular thermal mode of operation is selected.

The blower 5 has provision for one or more speeds. As indicated above and shown in FIG. 1b, thermostat 7 has, in the embodiment illustrated, five selectable switch settings, "heat", "cool", "off", "auto" fan, and fan "on". The switches shown in FIG. 1b may be set for the cooling mode, and the fan set for "automatic". In the "automatic" fan setting mode, the air conditioning system cycles on and off, its operation being based upon the temperature as sensed by the thermostat 7 when compared with a pre-selected temperature set by the user. The blower 5 runs only so long as is necessary to bring the temperature to the pre-selected value, ignoring fan delays employed in the system. In the heating mode, and "automatic" fan selection, the operation of the HVAC system is similar, except that heating rather than cooling is provided.

In the blower "on" switch position, power is supplied continuously to run blower 5. If neither the heating or cooling switch is in its "on" position, no heating/cooling mode condition is provided. That is, air merely is circulated through the system. When in circulation mode, if either the heating or cooling switch also is closed, the thermal condition system selected again will cycle depending upon the thermostat sensed demand, but the blower 5 will run continuously.

As indicated above, many users prefer the blower "on" mode, whether or not a thermal mode of operation also is selected. Continued use of the blower 5 minimizes temperature gradients and variations, improves humidity control and increases the effectiveness of air cleaning devices that may be employed with the HVAC system 1. Certain prior art systems when in fan "on" mode, are unable to distinguish the operational status of the thermostat 7, so that the blower 5 is connected to operate at its highest normal designed speed. Consequently, the HVAC system is neither economical nor quiet in operation. Even if a conventional motor has its speed reduced for blower "on" operations, the motor cannot be operated at low power consumption. First, the speed is not low enough, so that power input to the motor is not reduced significantly. Second, very low speeds occur at the unstable operating area of the motor's speed/torque curve, increasing the possibility the motor will not accelerate to speed against the system load requirement.

Figure 2:
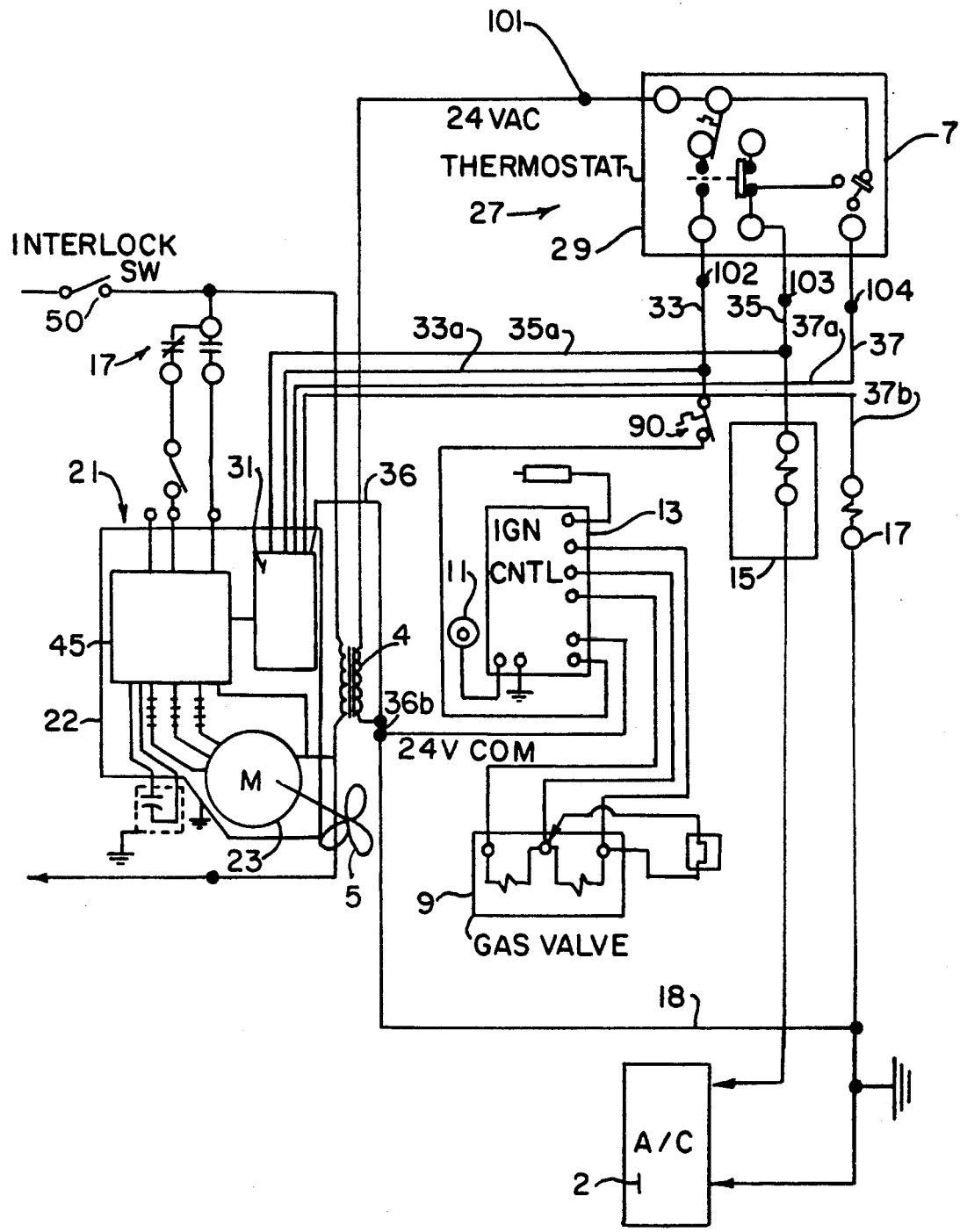
FIG. 2 is a schematic of the system shown in FIG. 1b, employing one illustrative embodiment of our invention.

As shown in the drawings, particularly FIGS. 2 and 3, our invention can sense the operating condition of the system, and functions to start the motor automatically at a speed sufficient to accelerate the motor against the system load requirements.

It is also known to employ variable speed motors for the motor 23. Variable speed motors, for example, conventional induction or brushless permanent magnet types, are controllable for providing a variety of speeds for the blower 5. They require a power inverter. Our invention provides the substantial advantages of low cost continuous blower operation at an economical circulation speed, in a package that is compatible with existing four wire thermostat designs, while being installable by original equipment manufactures, by field service personnel or by home owners. Retrofitting is easily accomplished within the physical confines of the present air handler structures.

Referring now to FIG. 2, a conversion means or apparatus 21 includes an enclosure 22 housing a motor 23, power switch means 45, and switching logic means 31. The apparatus 21 preferably is provided in a single enclosure 22. Motor 23 conventionally includes a stator and rotor assembly, not shown, in FIG. 2, and a shaft extending through a shell on at least one end of a pair of end shields. The end shields include bearings for mounting the motor and shaft and permit the rotation of the shaft to convert the electrical energy of the motor 23 to mechanical energy through the blower 5. The switches 45 and logic means 31 preferably are incorporated in or attached to the motor, generally along one of the end shields. If desired however, the controls may be provided in a separate package and interconnected to the motor in accordance with the principles of this invention.

Switch logic 31 has five connections. The thermostat 7, has four terminal connections indicated by the reference numerals, 101, 102, 103 and 104 respectively. Terminal 101 is connected to one side of the control transformer 4. Terminal 102 of thermostat 7 is connected by a line 33 to an input 33a of the switch logic 31, and through a temperature limit control switch 90 to the ignition control 13. Terminal 103 is connected via line 35 and a line 35a to switch logic means 31. The terminal 103 also is connected via a contactor relay 15 to the air conditioning side 2 of the HVAC system. Terminal 104 is connected via line 37 and 37a to a terminal of switch logic means 31. A line 37b is connected from the switch logic means 31 to a first side of a relay 17. The second side of relay 17 is connected along a line 18 to the second side of transformer 4 and to a connection 36 from mean 31. The connection 36 also is connected to the second side of control transformer 4 at a connection point 36b. It thus may be observed that the apparatus 21 is interconnected easily and completely into the thermostat circuit of prior art devices merely by the interconnection of four leads with the four leads of the conventional thermostat circuit, with one additional lead running from the switch logic means 31 to the relay 17. All of these connections may be accomplished at the blower location of the HVAC system easily and completely.

The other interconnection of the apparatus 21 is through the relay 17 contactor to one side of a standard line voltage supply through an interlock switch 50.

Figure 3A:
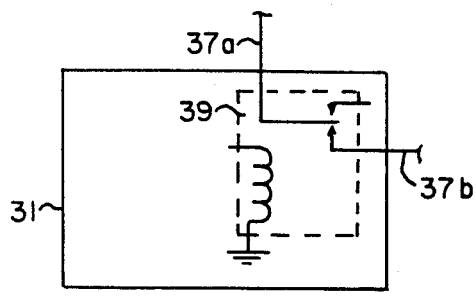
FIGS. 3a-3c are schematic variations in which a logic unit of the present invention may be implemented.
Figure 3B:
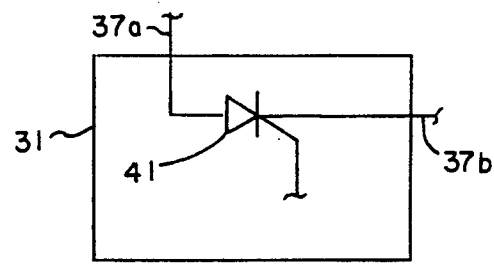
Figure 3C:
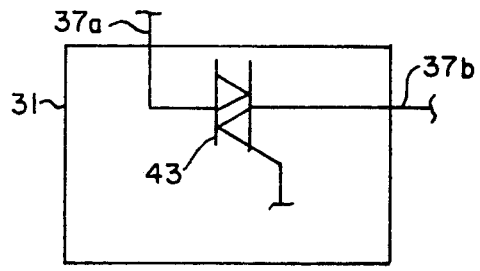

Switch means 45 may comprise a variety of arrangements, depending upon the type of motor 23 employed in the apparatus 21. For example, the initial embodiment of our invention uses a standard induction motor construction. Motor 23 is a 12 pole/6 pole motor and the application of energy to the windings is controlled by the logic means 31 depending upon the sensed condition of the thermostat 7. It is contemplated that other embodiments of the invention will utilize other types of motors. For example, the switch logic 31 may include electrical/mechanical devices such as relays 39 or solid state SCRs 41 or triacs 43 as shown in FIGS. 3a-3c.

Figure 4A:
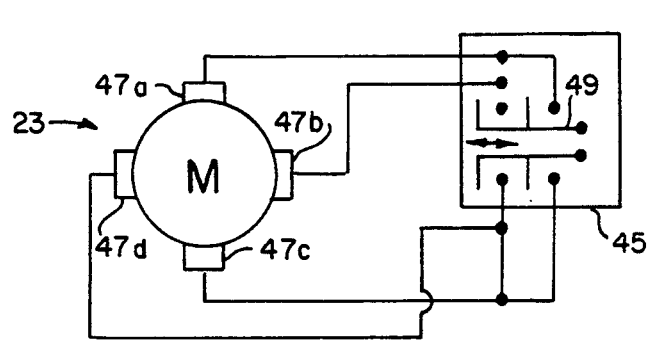
FIGS. 4a-4d represent schematic views illustrating variations in which the speed of the blower utilized in conjunction of the present invention may be changed.
Figure 4B:
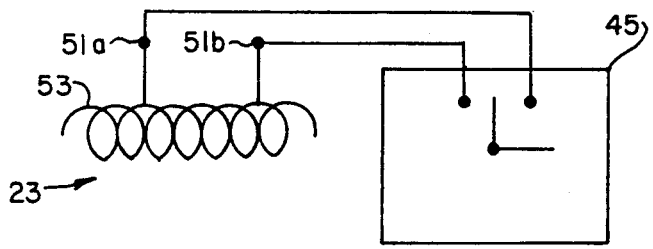

The switch means 45 preferably enables motor 23 to run at least at 2 speeds, a high speed when thermal mode is directed by the user, and a substantially lower speed and lower watts when the blower 5 is set to run continuously, but a thermal mode setting is not active or not employed. As indicated, motor 23 can be made to run at these speeds at any number of different ways. Thus, motor 23 may have multiple poles 47a through 47d, for example, as symbolized in FIG. 4a, which can be switched into and out of the motor circuit as required. Switch means 45 in that embodiment, includes a two position switch 49. In one position, the motor circuit uses only the poles 47a, 47c. In the other switch position, all motor poles are in the circuit. Alternatively, as shown in FIG. 4b, motor 23 can have at least two electrical taps, 51a, 51b on one or more of motor windings 53. The switch means 45 then can switch between the various taps to alter motor speed. Again, switching may be accomplished through electro/mechanical devices such as relays or solid state devices such as SCRs, triacs or MOSFETS.

Figure 4C:
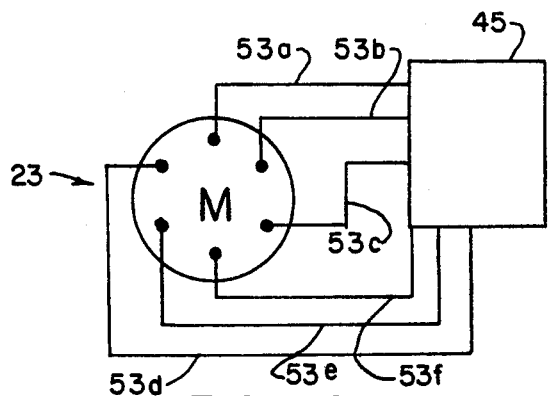
Figure 4D:
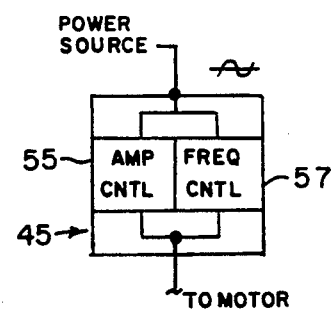

FIG. 4c shows various windings 53a-53f of motor 23 attached to the switch means 45 so that the order in which current supply to the windings is varied. Thus, the voltage or current supply to the motor may be altered to alter speed, as represented in FIG. 4d, when the motor 23 is a switch reluctance or a permanent magnet motor, for example. Those skilled in the art will recognize that there are additional structures and methods by which motor 23 speed can be varied so that blower 5 operates at substantially low speed when a thermal mode operation is not signaled by the thermostat 7.

Figure 5:
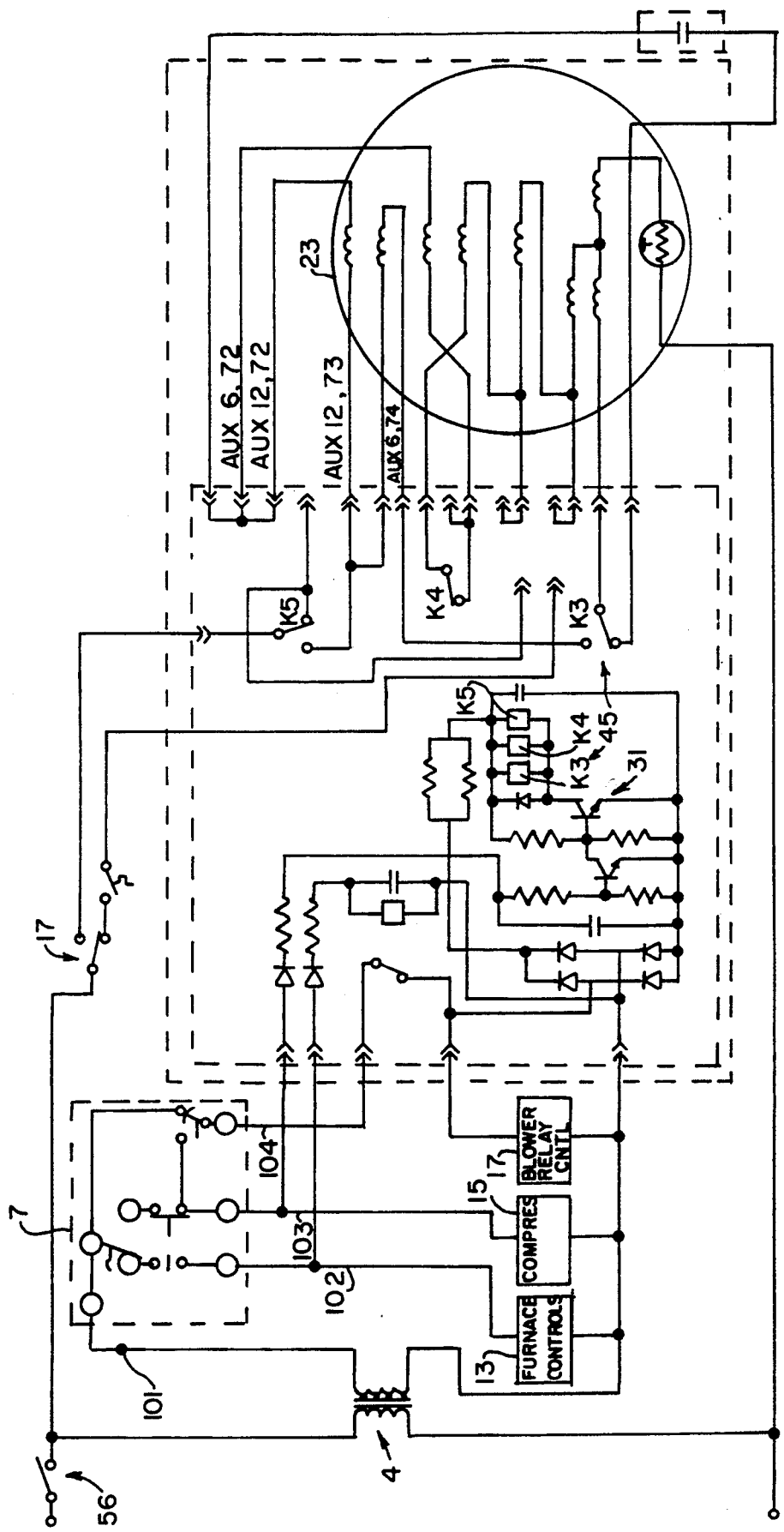
FIG. 5 is a more detailed schematic view of the embodiment of our invention shown in FIG. 2.

Another feature of our invention is that the direction of rotation of the motor 23, which is shown as a 6 pole/12 pole induction motor in FIG. 5, maybe obtained easily by switching the 6 pole auxiliary connections 71/74 and the 12 pole auxiliary connections 72/73 simultaneously. Other embodiments of the invention may employ simple plug arrangements to facilitate that reversal.

Figure 6:
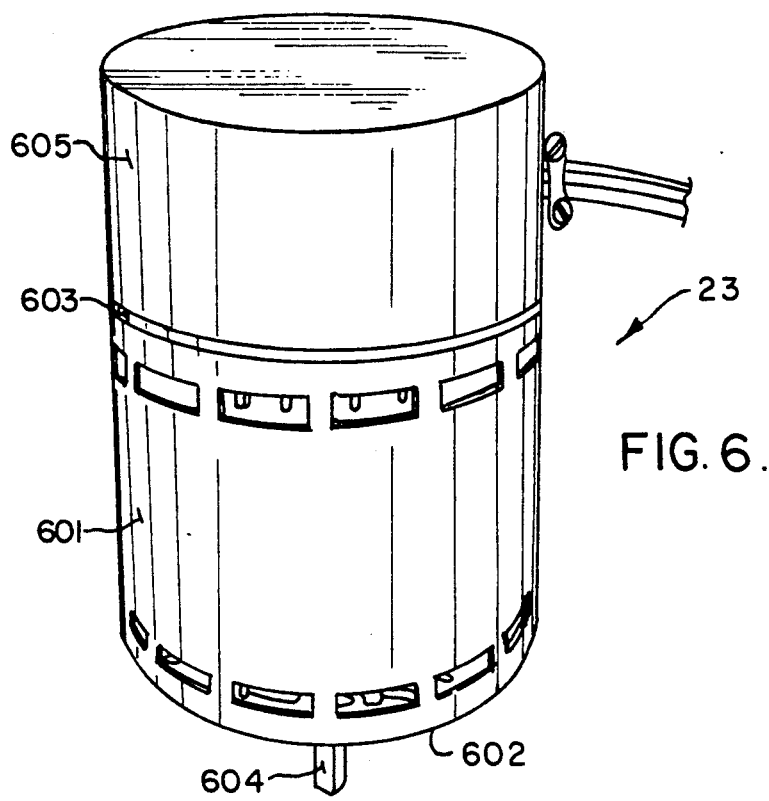
FIG. 6 is view in perspective of our invention embodied in a dynamoelectric machine.
Figure 7A:
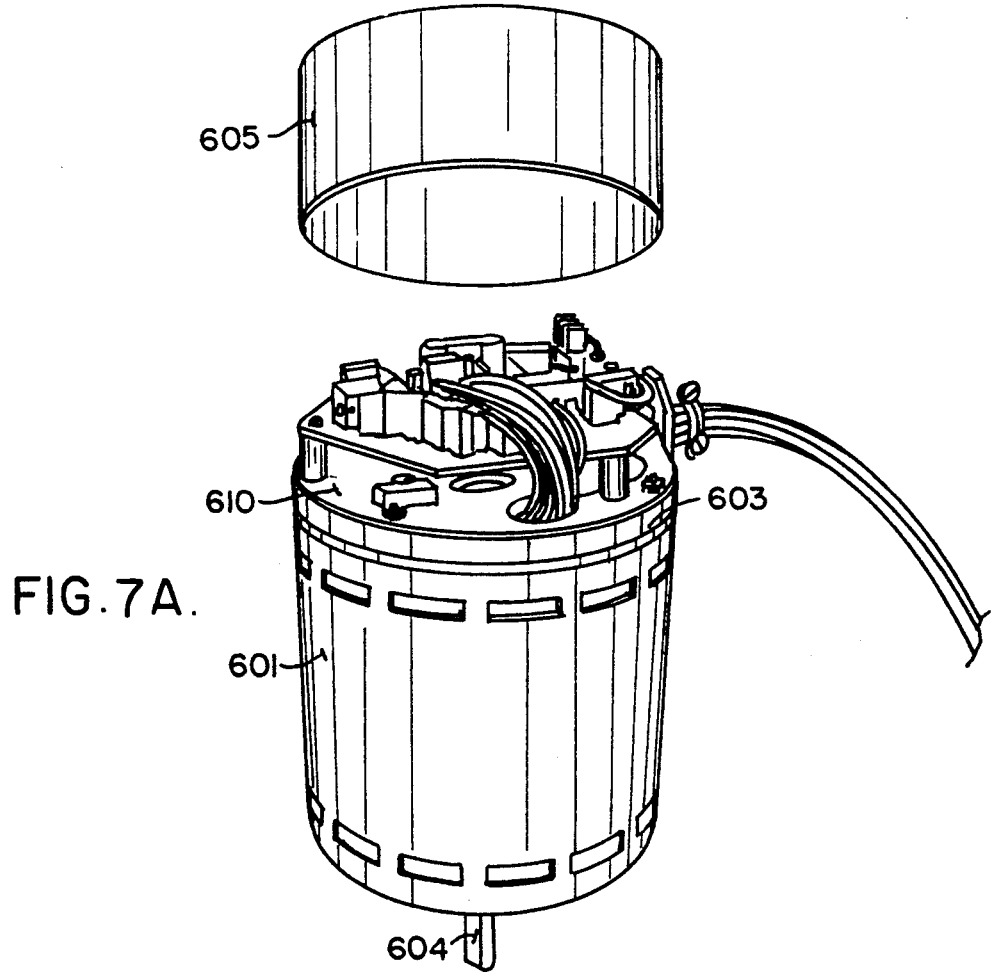
FIG. 7a and 7b are exploded views of the dynamoelectric machine of FIG. 6.
Figure 7B:
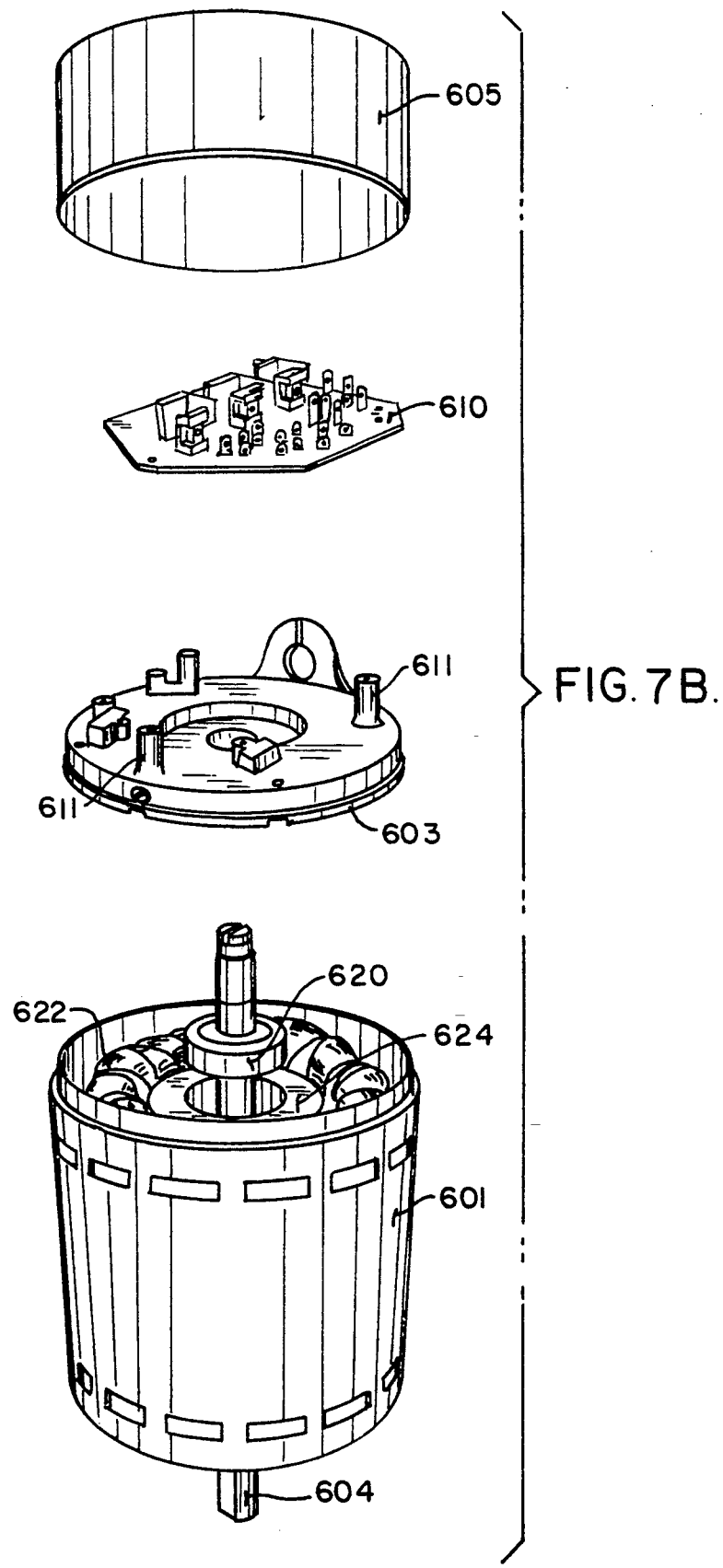

FIG. 6 illustrates the simplicity with which our invention may be incorporated in conventional HVAC systems. The motor 23 is shown in an illustrative physical form. The embodiment illustrated, includes a shell 601 closed at each end by an end shield 602 and an end shield 603. The end shield 602 is conventional and has a motor shaft 604 extending from it. The end shield 603 has a closure 605 attached to it. As shown in FIG. 7a and 7b, the closure 605 protects a circuit board 610 which is mounted to the end shield 603 in a conventional manner. The end shield 603 is designed to accept the circuit board 610 in mounting relationship, and mounting studs 611 are provided for that purpose. The end shield 603, in addition to its circuit board mounting function, provides the enclosure for bearing 620 which supports the second end of the shaft 604.

As will be appreciated by those skilled in the art, the motor 23 includes a stator assembly 622 and a rotor assembly 624 constructed as described above.

The entire package is compact, economical to manufacture and is sized so as to be adoptable for use in present HVAC systems.

Figure 8:
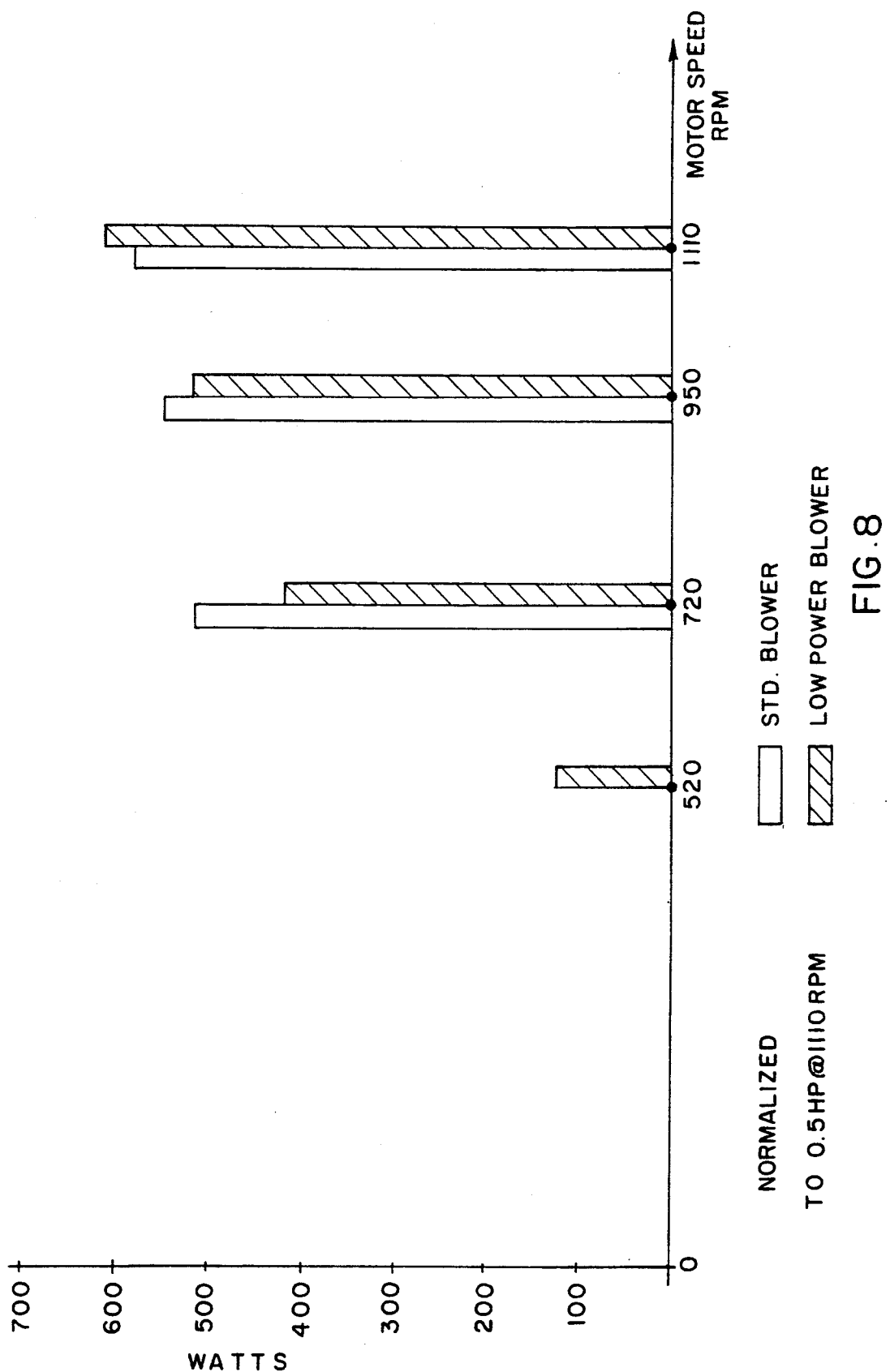
FIG. 8 is a graph of motor input watts versus motor speed illustrating the economical operating characteristic of the invention.

The economy of operation is illustrated in FIG. 8. As there shown, a motor input watts for a conventional induction motor is plotted against speed and compared with motor input watts for a motor converted to operate in accordance with our invention. Conventional blower motors are commonly tapped to give an operating speed range of from 720 RPM to 1100 RPM. Such motors might, for example, operate at 1100 RPM for air conditioning, 950 RPM for heating, and 720 RPM during fan "on" continuous operation. Conventional blower motors are not designed to operate at the 520 RPM position shown. Because conventional blower motors as generally found in HVAC systems cannot operate at this low speed, they suffer in the input watt comparison for fan "on" operation. Input watts at the higher speeds, i.e., 720 RPM and above are approximately equivalent for similar speeds. That is, while the input watts for one of these speeds for a particular motor maybe greater or less than the other, the difference is not generally significant in the overall operating cycle of the HVAC system. Because our invention operates at a substantially lower speed for fan "on" operation, however, input watts for the system are significantly lower for our invention. FIG. 8 graphically illustrates this input watt reduction for system operation.

Numerous variations, within the scope of the appended claims, will be apparent to those skilled in the art in light of the foregoing description accompanying drawings. As indicated, the motor may comprise a variety of known electrical types. While an integral package for the control and motor is preferred, the control may be separated from the motor. The motor 23 may drive a variety of blower 5 types. While the HVAC system described in a conventional gas furnace having a separate air conditioning unit, the invention maybe applied to heat pump and other combustion furnaces.

These variations are merely illustrative.

Having thus described the invention, what is claimed and desired to be secured by Letters Patent is:

1. In a heating and/or air conditioning system employing an electric motor driven blower fan capable of running within a range of speeds, the system having a plurality of operating modes with the speed of the fan depending upon which operating mode is selected at a particular time, a first of the modes being a thermal mode which includes use of the fan, and a second of the modes being a circulate mode which also includes use of the fan but without heating or cooling, apparatus for controlling the speed of the motor for the fan to run at a first speed when the first mode is selected, and at a second and substantially slower speed when the seconds mode is selected, said second speed being less than seven hundred revolutions per minute, the apparatus comprising pole switching motor means for running the fan at different speeds within its range of speeds, means for detecting the condition of the environment on which the system operates, switch means for selecting a particular system operating mode, logic means responsive to the switch means for determining in which operating mode he system is, and means responsive to the logic means for selecting the speed of the motor and hence that of the fan as determined by the mode selected such that said motor automatically starts at said first speed.

2. The apparatus of claim 1 wherein the motor is one of a controlled induction motor, a permanent magnet motor, or a switched reluctance motor.

3. The apparatus of claim 2 wherein the control means includes means for electronically changing the number of motor poles to change the speed of the motor.

4. The apparatus of claim 2 wherein the control means includes means for changing at least one of the amplitude or frequency of the current supplied to the motor to change the speed of the motor.

5. The apparatus of claim 2 wherein the control means includes means for changing at least one of the amplitude or frequency of the voltage supplied to the motor to change the speed of the motor.

6. The apparatus of claim 2 wherein the motor has a plurality of winding taps and the control means includes a means for changing the taps to change the speed of the motor.

7. The apparatus of claim 2 wherein the detecting means includes a thermostatic means.

8. The apparatus of claim 2 wherein the system includes fan control means and the detecting means includes means responsive to the setting thereof.

9. The apparatus of claim 2 wherein the control means includes electro-mechanical means.

10. The apparatus of claim 2 wherein the control means includes electronic devices.

11. In an HVAC system having an electric motor driven blower fan capable of running with a range of speeds, the system having at least two operating modes requiring use of the fan, the speed of the fan depending upon which operating mode is selected, one of the modes being a thermal mode and the other mode a fan "on" which also involves use of the fan but without thermal conditioning, and switch means for selecting one of said operating modes; the improvement comprising apparatus for controlling the speed of the motor for the fan to start and run at a first speed when the one mode is selected, and to operate at a second and substantially slower speed, said slower speed being less than seven hundred revolutions per minute, when the other mode is selected, the apparatus including motor means capable of running the fan at different speeds within its range of speeds, said apparatus including an enclosure, means for detecting the condition of the environment on which the system operates, switch means for selecting a particular system operating mode, logic means responsive to the switch means for determining in which operating mode the system is, and means responsive to the logic means for controlling the motor winding connections so as to vary the speed of the motor and hence that of the fan such that said motor automatically starts at said first speed, said logic means and said switch means being mounted in said enclosure. functions to start the motor automatically at a speed sufficient to accelerate the motor against the system load requirements.

12. In an HVAC system having a blower, and a thermostat circuit having a thermostat control for controlling the HVAC system, said thermostat having a three way demand cycle, said demand cycle including a heating setting, a cooling setting, and a circulating setting, said heating and cooling conditions defining thermal conditions for said HVAC system, the improvement comprising means electrically connectable between said thermostat control and said blower for operating said blower to substantial slower speed than the speed required for a thermal condition setting of said thermostat control, said slower speed being less than seven hundred revelations per minute, said means including a motor, said motor including an enclosure, a stator assembly mounted in said enclosure, said stator assembly including a plurality of electrical winding poles connectable in a first pole configuration for the speed required for the thermal condition setting and second pole configuration in said second substantially slower speed configuration, switch logic means mounted in said enclosure for selecting the pole configuration, and power switch means responsive to said switch logic means for effecting the change in pole configuration, said switch logic means automatically selecting said first speed of operation when said thermostat control demands the thermal condition and automatically selecting said slower speed when the thermal condition is satisfied at said thermostat control and the circulating setting is selected at said thermostat control.

13. The improvement of claim 12 further including a circuit board, said switch logic and said switch means being mounted to said circuit board.

14. The improvement of claim 13 where said motor includes at least one end shield, said circuit board being mounted to said end shield.

15. The improvement of claim 14 where further including an enclosure mounted to said endshield for protecting said circuit board.

16. The improvement of claim 15 further including means for reversing rotation of said motor.

17. The improvement of claim 16 where said motor is connectable in at least an eight pole arrangement for obtaining said substantially slower speed.

18. The improvement of claim 12 the wherein the motor is one selected from the group of a controlled induction motor, a permanent magnet motor, or switch reluctance motor.

19. The improvement of claim 18 further including means for electrically changing the number of poles of said motor.

20. The improvement of claim 19 further including means for changing one of the amplitude or frequency of the electrical supply of said motor.

* * * * *

UNITED STATES PATENT AND TRADEMARK OFFICE
CERTIFICATE OF CORRECTION

PATENT NO. : 5,197,667
DATED : March 30, 1993
INVENTOR(S) : Bowsky, et al

It is certified that error appears in the above-indentified patent and that said Letters Patent is hereby corrected as shown below:

Column 1, Line 7, delete "elates" and insert -- relates --
Column 5, Line 22, delete "mean" and insert -- means --
Column 7, Line 25, delete "seconds" and insert -- second --
Column 7, Line 36, delete "he" and insert -- the --
Column 8, Line 27, delete "functions to start the motor automatically at a speed sufficient to accelerate the motor against the system load requirements"

Signed and Sealed this

Twenty-seventh Day of December, 1994

Attest:

BRUCE LEHMAN

Attesting Officer     Commissioner of Patents and Trademarks